R. H. F. FINLAY.
METHOD OF MANUFACTURE OF BICARBONATE OF SODA.
APPLICATION FILED JULY 17, 1908.
961,945.
Patented June 21, 1910.
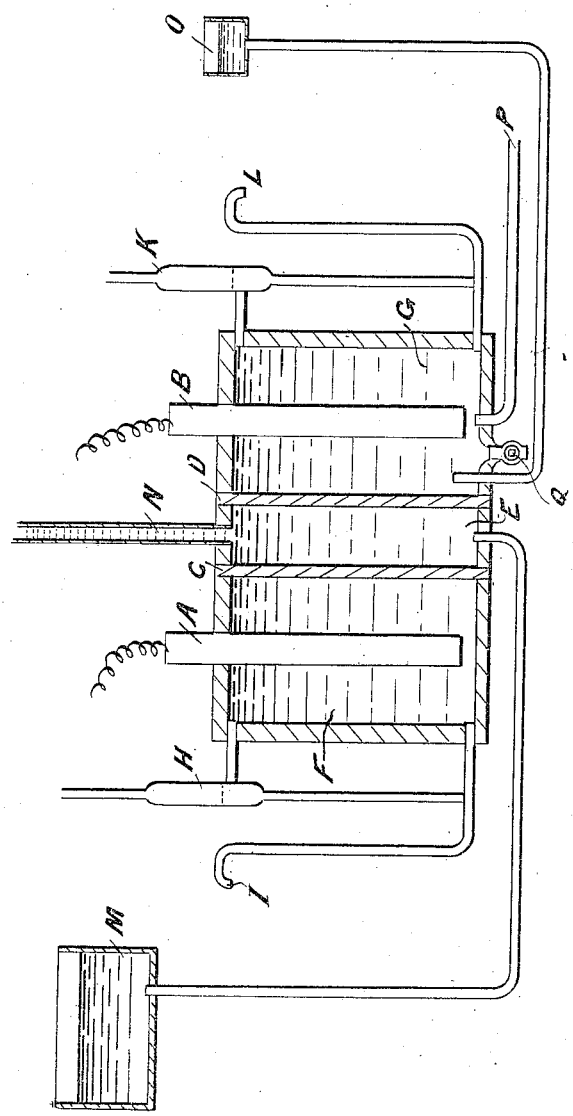
Witnesses:
S. Kwman
H. D. Penney
Inventor:
Robert H. F. Finlay,
By his Attorney,
F. H. Richards

UNITED STATES PATENT OFFICE.

ROBERT HUGH FORSYTHE FINLAY, OF BELFAST, IRELAND.

METHOD OF MANUFACTURE OF BICARBONATE OF SODA.

961,945. Specification of Letters Patent. Patented June 21, 1910.

Application filed July 17, 1908. Serial No. 444,005.

*To all whom it may concern:*

Be it known that I, ROBERT HUGH FORSYTHE FINLAY, a subject of the King of Great Britain, residing in Belfast, Ireland, have invented certain new and useful Improvements in the Method of Manufacture of Bicarbonate of Soda, of which the following is a specification.

This invention relates to improvements in the method of manufacture of bicarbonate of soda and it has for its object certain improvements in the ordinary or so-called Solvay ammonia-soda process, whereby I am enabled to dispense with the necessity for distilling the liquid from which the bicarbonate of soda has been precipitated (hereinafter called the mother liquor), avoid the use of lime, and the loss of ammonia and undecomposed salt contained in the discharge from the stills after distillation—the disposal of which discharge constitutes rather a troublesome feature of the ammonia-soda process as now carried out.

The present invention moreover presents the important advantage that I am enabled to recover the chlorin of the salt acted upon, in the valuable form of chlorin gas, instead of as heretofore permitting it to pass away with the discharge above mentioned in the comparatively worthless form of calcium chlorid.

In carrying the invention into effect I follow the earlier steps of the well known ammonia soda process up to the point at which the mother liquor has to be dealt with. That is to say, I treat the brine, (a solution of sodium chlorid in water) with ammonia and carbonic anhydrid so as to obtain a precipitate of bicarbonate of soda, ammonium chlorid being left in solution as well as some undecomposed sodium chlorid and some ammonia and carbonic anhydrid, chiefly in the form of bicarbonate of ammonia.

The precipitated bicarbonate of soda being removed and treated in the usual manner the mother liquor is passed directly, or after treatment with carbonic anhydrid, into the cathode chamber of an electrolytic cell, or battery of cells, constructed preferably after the manner set forth in the United States Patent No. 850,867, brine being supplied at the same time into the other chamber or chambers. The ammonium chlorid in the mother liquor is here electrolyzed, and ammonia is set free at the cathode and combines with carbonic anhydrid, if present, chlorin being also set free at the anode. In some cases I adopt the well known expedient of introducing carbonic acid to the cathode chambers by a pipe.

After electrolysis I remove the liquids and gases from the cathode chambers. The hydrogen formed at the same time as the ammonia is readily eliminated, being insoluble. Water also may be eliminated from the liquid by evaporation at this stage. The liquid which now contains some common salt and the ammonium chlorid which has not been decomposed by electrolysis may be used instead of brine in the first reaction of the process in which meeting with the ammonia liberated by electrolysis and carbonic anhydrid, bicarbonate of soda is again precipitated and the mother liquor again treated as described.

If salt be added to the mother liquor before, and carbonic anhydrid be injected during electrolysis, bicarbonate of soda may be formed in the cathode chamber of the cell. In this case the chamber should be made larger than would otherwise be necessary and be furnished with suitable means for removing the precipitate.

In order that the invention may be the better understood reference is made to the accompanying drawings showing a digrammatic representation of one element consisting of one anode, one cathode, one anode chamber, one cathode chamber, and one electrolyte chamber together with the necessary pipes and fittings used in connection with the preferred arrangement of electrolytic cell I adopt.

In the accompany drawings A indicates the anode, and B indicates the cathode.

C and D are diaphragms and E is the electrolyte chamber.

F is the anode chamber and G the cathode chamber, and H and K indicate vessels for separating the liquids and gases which come from the anode and cathode chambers.

I is a vent to take away overflow from anode chamber and L is a vent for the cathode chamber.

M indicates the brine cistern supplying electrolyte chamber and N a column of liquid at the same level as in M producing pressure on electrolyte chamber.

O represents means for supplying the liquid containing ammonium chlorid to the cathode chamber and P is a pipe for supplying carbonic anhydrid to said cathode chamber.

Q represents means for removing the bicarbonate of soda precipitated in cathode chamber.

In operation F and E are filled with brine, G is filled with liquor containing ammonium chlorid. The head on E causes brine to pass through diaphragm C to F likewise D to G, all the time the apparatus is in use, I and L being always open to prevent the pressure in F and G rising, and to allow the liquids entering F and G to pass out again.

When the electric current is on, chlorin is evolved at A in small bubbles which pass over into H carrying with them a quantity of the liquid in F. Here (in H), the separation of the gas and the liquid takes place—the chlorin passing out at the top and the liquid at the bottom of the separator H. This liquid returning immediately to F causes a vigorous circulation in F. The liquid passing away at I is the brine which passes through C (from E to F as explained) deprived of a portion of its salt by the electrolysis. In like manner hydrogen and ammonia are evolved on B, the hydrogen passes into K and escapes at its upper end, the liquor it carries with it passes out at its lower end, and back to G again causing a vigorous circulation. The ammonia is found dissolved in the liquid which comes away at L and partly in the gas coming away at the top of K from which gas it is recovered by well known means. The common salt is dissolved in the liquid from L, and carbonic acid is added to produce a precipitate of bicarbonate of soda. The ammonium chlorid liquor is fed at O all the time the electric current is on and the quantity supplied at O is proportioned to the current employed.

Another method is to pass carbonic anhydrid into G through P otherwise the process is similar. This combines with the ammonia formed on B and reduces the electromotive force required for the cell. If the ammonium chlorid liquor in this case is saturated with common salt before entering O bicarbonate of soda is precipitated in G and may be removed at Q. Some may pass out at L with the other compounds formed in G all of which are recovered and utilized by well known means.

It will be seen that in my improved ammonia-soda process I decompose the ammonium chlorid in the mother liquor in a suitable electrolytic cell or battery of cells so as to recover the ammonia therefrom and render it available for use again in the primary reaction, at the same time obtaining the chlorin in the form of gas, and hydrogen.

Having now particularly described and ascertained the nature of my said invention and in what manner the same is to be performed I declare that what I claim is:

1. In the manufacture of bicarbonate of soda by the Solvay process, subjecting the mother liquor to electrolysis in the cathode chamber of a cell separated by one or more diaphragms from the anode chamber which is filled with sodium chlorid solution for the purpose of recovering the ammonia and obtaining hydrogen and chlorin.

2. In the manufacture of bicarbonate of soda by the Solvay process, subjecting the mother liquor, after the addition of sodium chlorid, to electrolysis in the cathode chamber of a cell, separated by one or more diaphragms from the anode chamber which is filled with sodium chlorid solution for the purpose of recovering the ammonia and obtaining hydrogen and chlorin.

3. In the manufacture of bicarbonate of soda by the Solvay process, subjecting the mother liquor to electrolysis in the cathode chamber of a cell which is supplied with carbonic anhydrid and which is separated by one or more diaphragms from the anode chamber which is filled with sodium chlorid solution for the purpose of recovering the ammonia and obtaining hydrogen and chlorin.

4. In the manufacture of bicarbonate of soda by the Solvay process, subjecting the mother liquor after the addition of sodium chlorid, to electrolysis in the cathode chamber of a cell, which is supplied with carbonic anhydrid and which is separated by one or more diaphragms from the anode chamber which is filled with sodium chlorid solution for the purpose of recovering the ammonia and obtaining hydrogen and chlorin.

5. In the manufacture of bicarbonate of soda by the Solvay process, subjecting the mother liquor to electrolysis in the cathode chamber of a cell separated by one or more diaphragms from the anode chamber which is filled with a sodium salt solution for the purpose of recovering the ammonia and obtaining hydrogen and chlorin.

6. In the manufacture of bicarbonate of soda by the Solvay process, subjecting the mother liquor, after the addition of a sodium salt, to electrolysis in the cathode chamber of a cell, separated by one or more diaphragms from the anode chamber which is filled with a sodium salt solution for the purpose of recovering the ammonia and obtaining hydrogen and chlorin.

7. In the manufacture of bicarbonate of soda by the Solvay process, subjecting the mother liquor to electrolysis in the cathode chamber of a cell which is supplied with carbonic anhydrid and which is separated by one or more diaphragms from the anode chamber which is filled with a sodium salt solution for the purpose of recovering the ammonia and obtaining hydrogen and chlorin.

Signed at Belfast this first day of July 1908, in the presence of the two undermentioned witnesses.

ROBERT HUGH FORSYTHE FINLAY

Witnesses:
 WILLIAM JAMES GRAHAM,
 HENRY STURGEON.